Patented Nov. 11, 1924.

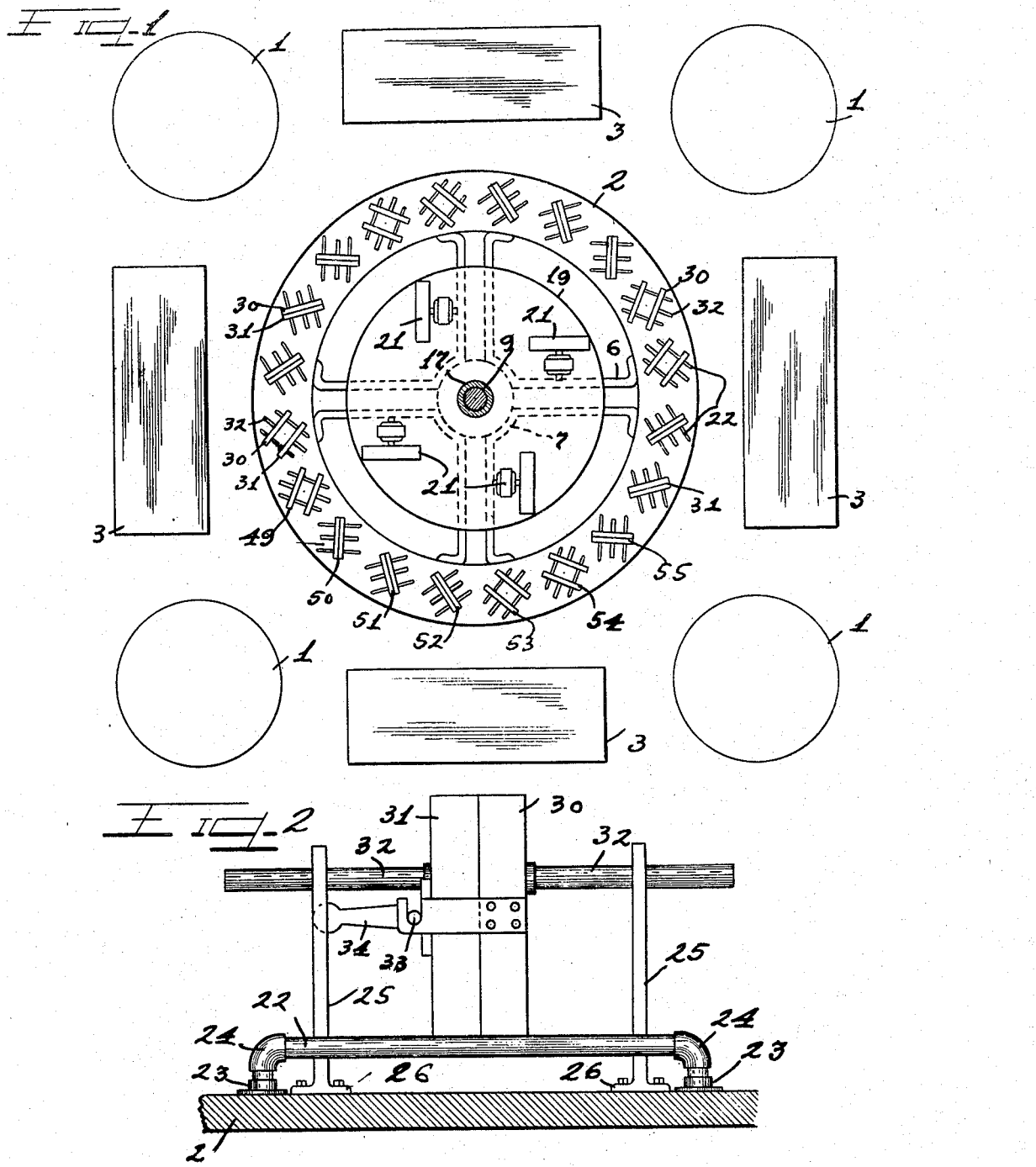

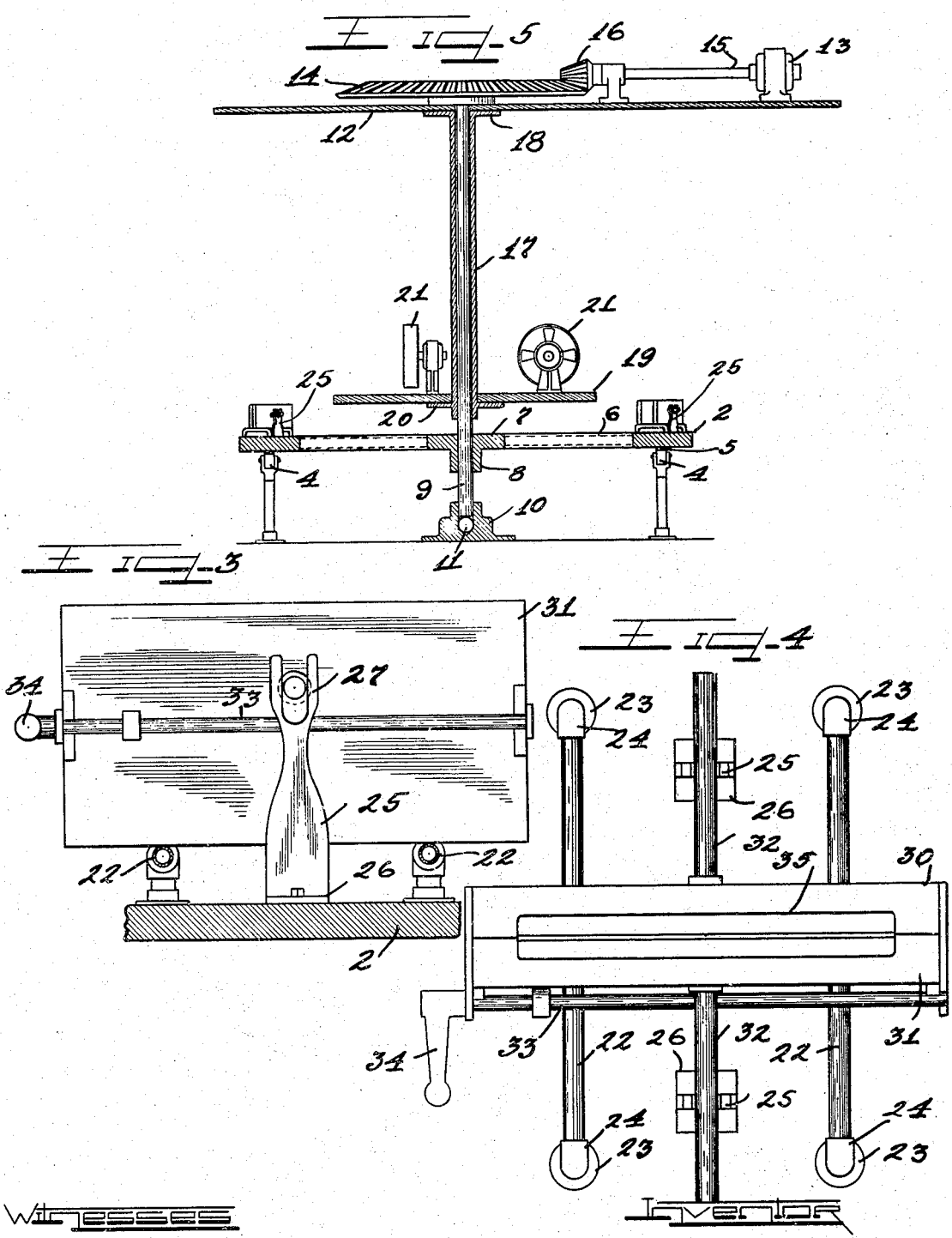

1,515,137

UNITED STATES PATENT OFFICE.

CHESTER M. ANGELL, OF CHICAGO, ILLINOIS, ASSIGNOR TO VESTA BATTERY CORPORATION, A CORPORATION OF ILLINOIS.

SYSTEM FOR MAKING LEAD CASTINGS.

Application filed February 27, 1922. Serial No. 539,430.

*To all whom it may concern:*

Be it known that I, CHESTER M. ANGELL, a citizen of the United States, and a resident of the city of Chicago, in the county of Cook and State of Illinois, have invented certain new and useful Improvements in a System for Making Lead Castings; and I, do hereby declare that the following is a full, clear, and exact description of the same, reference being had to the accompanying drawings and to the numerals of reference marked thereon, which form a part of this specification.

This invention relates to the arrangement of machinery in a factory in which lead castings, such as the grids for battery plates are made.

It is an object of this invention to so arrange the machinery that the workmen will have their work continuously brought to them and will not be obliged to walk about from one point to another in order to obtain either tools or material.

It is a further object of this invention to provide a conveyor which shall carry molds past the furnaces from which they are to receive molten metal and then past the workmen who are to manipulate the molds.

It is a further object of this invention to provide means for cooling the molds during transit.

It is a further object of this invention to arrange the furnaces and work tables about a circular conveyor in such a way that there shall be a saving of space.

It is a further object of this invention to provide a conveyor which shall move the molds with very little power and shall require a minimum of attention or repairs.

Other and further important objects of this invention will be apparent from the disclosures in the drawings and the specification.

The invention (in a preferred form) is shown on the drawings and hereinafter more fully described.

On the drawings:

Figure 1 is a plan view of the arrangement of the conveyor and surrounding machinery.

Figure 2 is an end view of one of the molds, showing in section a portion of the conveyor table.

Figure 3 is a side view of a mold, also showing in section a portion of the table.

Figure 4 is a top plan view of a mold and the supports for the same.

Figure 5 is a central vertical section through the conveyor table.

As shown on the drawings:

The arrangement includes a number of furnaces 1 (in the drawing it is illustrated as four furnaces) arranged about a circular conveyor table 2. Between each pair of furnaces is placed a stationary table 3 to receive the castings or to serve as a work bench for finishing the castings if any hand work is needed to finish them.

The conveyor table 2 is mounted upon a series of anti-friction rollers 4. Preferably the table is made of wood and the portion contacting with the rollers 4 is reinforced by a strap or rail 5 of metal. In order that the table shall be as light as possible, the greater part thereof is made open and the outer part which carries the molds is in the form of an annular wooden ring connected to the center by a series of spokes 6 separated by open spaces. The central portion 7 of the table is extended downwardly, as shown at 8, to constitute a hub.

Through this hub extends an upright shaft 9, the lower end of which is stepped in any suitable thrust bearing 10, preferably supplied with an anti-friction device 11. The shaft 9 is secured to the hub 8 by a key or other suitable device for insuring that the table will rotate with the shaft. The shaft extends upward above a support 12 which carries a motor 13.

The upper end of the shaft 9 is supplied with a large gear 14 which is driven from the motor 13 by a shaft 15 and a small gear 16. Although as illustrated but two gears are shown, and these are represented as bevel gears, it is obvious that any suitable reduction gearing may be used, whereby the table 2 is given a slow continuous rotation from the motor 13.

The upper portion of the shaft 9 is surrounded by a sleeve 17 which is secured to the support 12 by a suitable flange 18 or in any other desired manner. The shaft 17 serves to support a platform 19 by means of a flange 20 or in any other desired way. At properly chosen points upon the platform 19 there are mounted fans 21, each driven by its own motor. There are as many of these fans as there are furnaces.

The table 2 is supplied with a number of sets of rods or pipes 22 which are supported from the table 2 by attaching fixtures 23 and elbows 24. These rods are arranged in pairs each pair standing at an angle of about 45 degrees to that radius of the wheel which goes through the center of the space between that pair. There are five of such pairs to each furnace in the form of the invention illustrated, but it is obvious that a larger or smaller number could be used as desired. The pipes belonging to any one pair are separated by a distance great enough to bring them conveniently near to the ends of the mold which is intended to rest thereon.

Half-way between the two pipes there are a pair of standards 25 which are provided with outturned feet 26 which may be bolted to the table 2 or secured thereto in any other desired way. Each of the standards ends at its top in a Y 27 which is to receive the handle for one side of the mold.

This mold is of the form described in my copending application Serial No. 517,447, filed November 25, 1921, and will be only briefly described here. It consists of two parts 30 and 31 each provided with a handle 32. The two parts are secured together by a fastening device which is operated by a rod 33 rotated by means of a handle 34. Metal is introduced into the mold through the flaring opening 35.

In the operation of the device, the table is given a slow continuous rotation counter-clockwise, as seen in Figure 1. The operation is the same for each of the furnaces. The description given for one furnace will apply to all four. The molds are placed upon the rods 22 with the handles 32 resting between the arms of the Y's 27 at the top of the standards 25. Preferably all the molds are placed so that the handle 34 is in the same direction around the wheel in all cases.

As the wheel rotates, the mold at 50, which has been closed and fastened in its closed position, arrives opposite the furnace 1 which is shown in the lower left hand corner of Figure 1. A workman stationed near this furnace fills this mold through the opening 35 with melted metal from the furnace. The wheel moves so slowly that the workman has ample time to complete this operation before the mold arrives at the position 51. In this position, and during a considerable portion of its travel from the position 50 to this position, the mold is subjected to the cooling effect of one of the fans 21, and this continues until the mold arrives at the position 52, by which time the casting will be sufficiently hardened to make it proper to open the mold.

A workman stationed at 52 unfastens the mold by manipulating the handle 34, and taking the two handles 32 pushes down on them, thereby opening the mold, as indicated at 53. This is made possible by the free movement of the handles 32 between the arms of the Y's 27. The casting is then removed from the mold and placed upon the table 3, where it can be trimmed or otherwise treated if it needs treatment.

A workman at the point 54 receives the mold as it comes from the position 53 and cleans the two halves comprising the mold of any particles that may remain therein due to the casting operation. He then closes it and fastens it in the closed position so that the mold arrives at 55 ready for the next workman to pour lead into, as was done at 50.

The operations are then repeated and are finished by the time the mold arrives at the next furnace, and so on. When the mold at 50 has arrived at the position 51 the mold at 49 has arrived at the position 50, having been in the meantime cleaned and closed so that it is ready to be filled as the mold at 50 was filled. When the mold at 50 arrives at the position 52 the mold next behind 49 will have arrived at the position 50 to be filled in its turn, and so on.

Thus, if all the furnaces are working, all the molds upon the conveyor table 2 are performing some step in the process all the time so that there are no idle molds. Also each workman has his one operation to perform and molds involved in that operation arrive at this workman's position in succession so that he is not obliged to leave his station to secure what he needs for his work. If one of the furnaces is shut down the molds travel between that furnace and the next idly, but workmen will not be employed at that part of the conveyor table.

Without this arrangement, each mold must be surrounded with its quota of workmen and carriers bringing molds to it or taking them away. In this arrangement all the workmen occupied with any one furnace are between it and the conveyor table. The floor space rendered idle when a furnace is shut down is therefore much smaller under this system.

I am aware that numerous details of construction may be varied through a wide range without departing from the principles of this invention, and I therefore do not purpose limiting the patent granted otherwise than necessitated by the prior art.

I claim as my invention:

1. In a plant for making castings, a plurality of furnaces, a conveyer moving continuously in a circuit past each of said furnaces, and molds carried on said conveyer and adapted to be filled from said furnaces, the speed of the conveyer with relation to the distance between the furnaces being such that there is time for workmen adjacent the conveyer to discharge and recondition each mold while it is passing from one furnace to the next.

2. A conveyor table, mold supports thereon arranged in pairs, and means between the mold supports of each pair for holding the handles of the mold in position.

3. A circular conveyor table, molds carried thereon, a central shaft for driving said table, a support above said table, driving means for said shaft mounted on said support, a platform secured to said support and surrounding said shaft, and means mounted on said platform for cooling said molds.

4. A conveyor table for molds, mold supports upon said table, each of said mold supports consisting of a pair of tracks standing at an angle to the direction of progress of said conveyor.

5. A rotatable conveyor, a series of mold supports thereon, a separable mold on each support, handles on said molds, and guiding and positioning means for the handles mounted on the conveyor.

6. A rotatable conveyor, a series of mold supports thereon, a separable mold on each support, and handles on said molds adapted to be moved downwardly to separate the same.

In testimony whereof I have hereunto subscribed my name in the presence of two subscribing witnesses.

CHESTER M. ANGELL.

Witnesses:
CARLTON HILL,
JAMES M. O'BRIEN.